(12) United States Patent
Baardman et al.

(10) Patent No.: US 9,851,463 B2
(45) Date of Patent: Dec. 26, 2017

(54) INTERFERENCE ATTENUATION OF A RESIDUAL PORTION OF SEISMIC DATA

(71) Applicant: PGS Geophysical AS, Oslo (NO)

(72) Inventors: Rolf H. Baardman, Leiden (NL);
Roald G van Borselen, Leiden (NL);
Steven Fishburn, Houston, TX (US);
Alan Ryder, Houston, TX (US)

(73) Assignee: PGS Geophysical AS, Oslo (NO)

( * ) Notice: Subject to any disclaimer, the term of this patent is extended or adjusted under 35 U.S.C. 154(b) by 364 days.

(21) Appl. No.: 14/570,620

(22) Filed: Dec. 15, 2014

(65) Prior Publication Data

US 2016/0003958 A1    Jan. 7, 2016

Related U.S. Application Data

(60) Provisional application No. 62/019,525, filed on Jul. 1, 2014.

(51) Int. Cl.
*G01V 1/38* (2006.01)
*G01V 1/36* (2006.01)

(52) U.S. Cl.
CPC ............... *G01V 1/364* (2013.01); *G01V 1/38* (2013.01); *G01V 2210/32* (2013.01); *G01V 2210/3248* (2013.01)

(58) Field of Classification Search
CPC ...... G01V 1/364; G01V 2210/32; G01V 1/38; G01V 2210/3248
See application file for complete search history.

(56) References Cited

U.S. PATENT DOCUMENTS

| | | |
|---|---|---|
| 6,906,981 B2 | 6/2005 | Vaage |
| 2010/0008184 A1 | 1/2010 | Hegna et al. |
| 2010/0097885 A1 | 4/2010 | Moore |
| 2011/0096625 A1 | 4/2011 | Rentsch et al. |
| 2012/0215506 A1 | 8/2012 | Rickett et al. |
| 2012/0290214 A1 | 11/2012 | Huo et al. |
| 2013/0088235 A1 | 4/2013 | Hegna et al. |
| 2013/0088938 A1 | 4/2013 | Aaron et al. |
| 2013/0121109 A1* | 5/2013 | Baardman ............... G01V 1/36 367/24 |
| 2013/0135965 A1 | 5/2013 | Ji et al. |
| 2013/0182533 A1 | 7/2013 | Rentsch-smith |
| 2013/0235697 A1 | 9/2013 | Szydlik et al. |
| 2013/0315033 A1 | 11/2013 | Krohn |
| 2014/0043937 A1 | 2/2014 | Teyssandier et al. |

(Continued)

FOREIGN PATENT DOCUMENTS

| | | |
|---|---|---|
| GB | 2404442 | 2/2005 |
| WO | 2015063597 | 5/2015 |

OTHER PUBLICATIONS

Search Report for Related GB Application GB1511525.6, dated Dec. 8, 2015 (3 pgs).

(Continued)

*Primary Examiner* — Krystine Breier

(57) ABSTRACT

The present disclosure is related to methods, systems, and machine-readable media for interference attenuation of a residual portion of seismic data, such as may be recorded in a marine seismic survey. Recorded seismic data can be separated into a portion attributed to a source and a residual portion. Seismic interference attenuation can be performed on the residual portion.

22 Claims, 15 Drawing Sheets

(56) References Cited

U.S. PATENT DOCUMENTS

| | | | | |
|---|---|---|---|---|
| 2014/0078860 A1* | 3/2014 | Poole | ............... | G01V 1/36 367/7 |
| 2015/0212222 A1* | 7/2015 | Poole | ............... | G01V 1/36 702/14 |
| 2015/0293242 A1* | 10/2015 | Hegna | ............... | G01V 1/003 367/14 |

OTHER PUBLICATIONS

Fookes et al., "Practical interference noise elimination in modern marine data processing," SEG Technical Program Expanded Abstracts, Jan. 1999; 22(1), 4 pp.

Mexican Office Action for related MX Application No. MX/a/2015/008576, dated Apr. 4, 2017 (3 pages).

\* cited by examiner

INTERFERENCE ATTENUATION OF A RESIDUAL PORTION OF SEISMIC DATA

CROSS-REFERENCE TO RELATED APPLICATIONS

This application claims priority to U.S. Provisional Application 62/019,525, filed Jul. 1, 2014, which is incorporated by reference.

BACKGROUND

The petroleum industry has invested heavily in the development of marine seismic survey techniques that yield knowledge of subterranean formations beneath a body of water in order to find and extract valuable mineral resources, such as oil. High-resolution seismic images of a subterranean formation are helpful for quantitative seismic interpretation and improved reservoir monitoring. For a typical marine seismic survey, one or more marine seismic survey vessels tow one or more seismic sources below the surface of the water and over a subterranean formation to be surveyed for mineral deposits. Seismic receivers may be located on or near the water bottom, such as being fixed on the water bottom or anchored so as to be near the water bottom, on one or more streamers towed by the source vessel, or on one or more streamers towed by one or more other vessels. One or more of the vessels may contain marine seismic survey equipment, such as navigation control, seismic source control, seismic receiver control, and recording equipment. The seismic source control may cause the one or more seismic sources, which are typically air guns or marine vibrators, to actuate and produce acoustic signals at selected times (often referred to as "firing a shot" or "shooting").

Each acoustic signal is essentially a sound wave that travels down through the water and into the subterranean formation. At each interface between different types of rock or other formations of differing composition, a portion of the sound wave may be refracted, a portion of the sound wave may be transmitted, and another portion may be reflected back toward the body of water to propagate toward the surface. The streamers towed behind the vessel are generally elongated cable-like structures. Each streamer includes a number of seismic receivers that detect pressure and/or particle motion changes in the water created by the sound waves reflected back into the water from the subterranean formations. The seismic receivers thereby measure a wavefield that was ultimately initiated by actuation of the seismic source.

DETAILED DESCRIPTION

Figure 1:
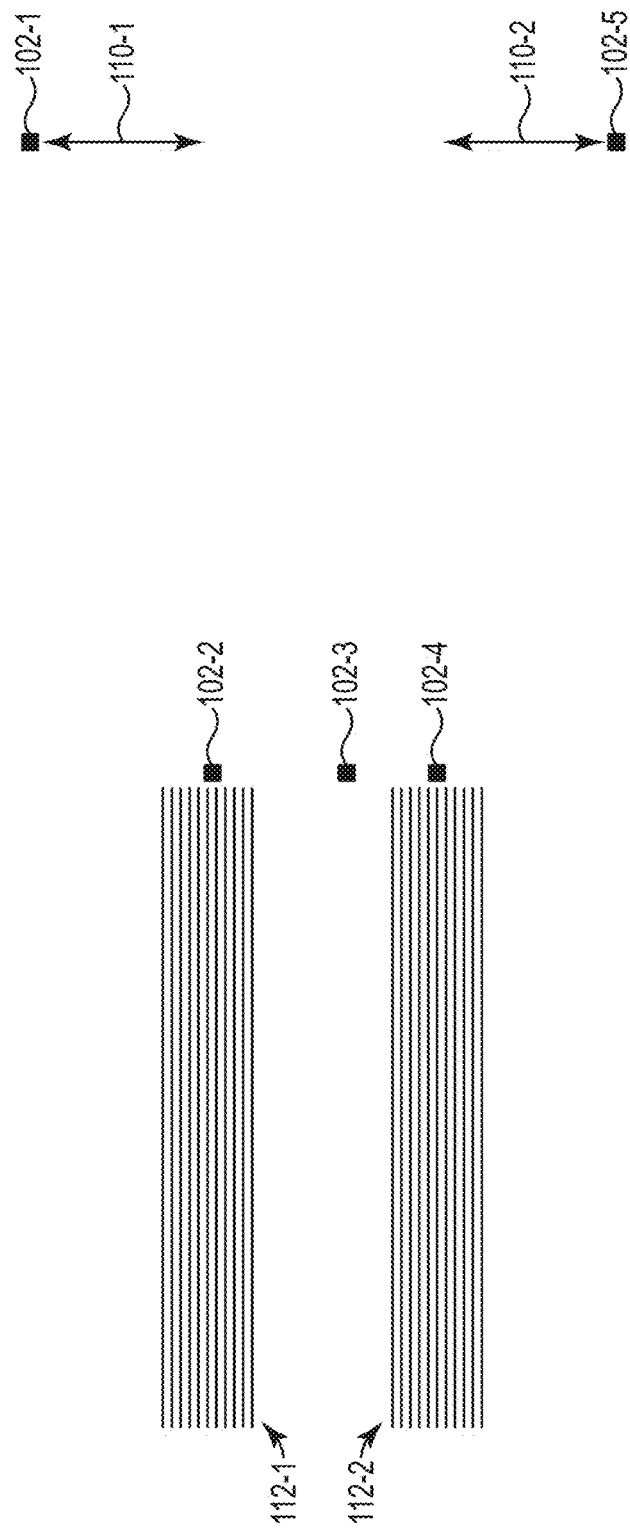
FIG. 1 illustrates a seismic data acquisition setup according to one or more embodiments of the present disclosure.

The present disclosure is not limited to particular devices or methods, which may vary. The terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. As would be understood by one of ordinary skill in the art with the benefit of this disclosure, embodiments and advantages described herein with reference to a "streamer" might be equally achievable and advantageous when used with a marine geophysical prospecting ocean bottom cable. Consequently, as used herein, "streamer" should be read to refer equally to a towed sensor cable as well as to an ocean bottom sensor cable.

The figures herein follow a numbering convention in which the first digit or digits correspond to the drawing figure number and the remaining digits identify an element or component in the drawing. Similar elements or components between different figures may be identified by the use of similar digits. For example, 216-1 may reference element "16-1" in FIG. 2, and a similar element may be referenced as 316-1 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

This disclosure is related generally to the field of marine seismic surveying. For example, this disclosure may have applications in marine seismic surveying, in which one or more seismic sources are used to generate wavefields that interact with subsurface formations, and sensors—either towed or ocean bottom—receive seismic energy generated by the seismic sources and affected by the interaction with the subsurface formation. For instance, embodiments of the present disclosure may include interference attenuation of a residual portion of seismic data, such as may be recorded in a marine seismic survey. Recorded seismic data can be separated into a coherent portion and a residual portion. Seismic interference attenuation can be performed on the residual portion.

Seismic interference can be a problem in marine seismic acquisitions. Seismic interference can arise from a temporal overlap between actuation of controlled and uncontrolled sources. A controlled source is a source under the control of an entity that intends to record data associated therewith. An uncontrolled source is a source that is either wholly uncontrolled or a source that is under the control of an entity other than the entity that intends to record data associated with the controlled source. Such temporal overlap includes the actuation of a controlled source and actuation of an uncontrolled source before the energy from the controlled source dissipates and/or is received by the relevant receivers. For example, seismic interference can result from the number of marine seismic surveys that are currently acquired in close vicinity of each other. In such instances, the location and/or actuation time of the uncontrolled source may be unknown. Thus, seismic interference can force either acquisition of surveys in time-sharing mode or application of substantial processing schemes to attenuate the seismic interference energy afterwards.

In contrast, some embodiments of the present disclosure can improve seismic interference attenuation. For instance, some embodiments can increase noise removal quality, for example, removal of seismic interference. Seismic interference attenuation can be combined with a separation processing phase that utilizes the coherency of seismic signal versus the incoherency of seismic interference in data domains such as common channel, common receiver, common depth point, common midpoint, and/or common offset. Recorded data, for example, recorded seismic data, can be separated into a coherent portion and a residual portion, which may be referred to as a noise bucket, where the seismic interference and/or other types of residual energy can be isolated. Instead of attenuating seismic interference from the unprocessed recorded data with all strong amplitude reflection energy still present, the seismic interference attenuation can be performed on the residual instead. As a result, reflection energy that was separated to the coherent portion will not be affected by the seismic interference attenuation process. Compared to seismic interference attenuation in the unprocessed recorded data, some embodiments of the present disclosure may reduce the risk of signal leakage and increase the quality of the seismic interference attenuation.

The characteristics and challenges of seismic interference energy may be analogized to deblending challenges faced in simultaneous source acquisitions. Like interfering simultaneous sources, which may be actuated with dithered firing times, seismic interference energy can exhibit irregular behavior from shot to shot. Blending and seismic interference energy can be treated with analogous algorithms. In a number of embodiments of the present disclosure, source separation, for example inversion based source separation, can be extended to include seismic interference energy.

FIG. 1 illustrates a seismic data acquisition setup according to one or more embodiments of the present disclosure. The setup can be a multi-vessel simultaneous source acquisition. A number of vessels 102-1, 102-2, 102-3, 102-4, 102-5 are illustrated. The vessel 102-2 is illustrated towing streamers 112-1 and the vessel 102-4 is illustrated towing streamers 112-2. In some embodiments, the vessel 102-2 and the vessel 102-4 can also be source vessels. The vessels 102-1, 102-3, and 102-5 can be source vessels. In some embodiments, at least one source close to the streamers can be actuated simultaneously with a source ahead of the streamers. As used herein a source vessel is a vessel that includes at least one source. The general term source is used herein to include source elements, which are individual sources such as an air gun, source units which are multiple source units that are actuated together, and source arrays, which are multiple source elements and/or multiple source units that are actuated separately.

This example uses field data from a multi-vessel full-azimuth simultaneous source survey acquired over 10,000 square kilometers in a body of water, such as the Gulf of Mexico. Very long offsets can be beneficial for imaging below complex salt structures. The survey may use simultaneous sources and may be acquired in a particular number of azimuths (e.g., 3 azimuths). The sources associated with the vessel 102-1 and the vessel 102-5, in front of the streamers 112-1, 112-2, contribute the desired offsets up to a particular length (e.g., 16 km). Together with the near offset sources associated at least with vessel 102-3, but in some embodiments, also with vessel 102-2 and vessel 102-4, close to the streamers 112-1, 112-2, a full-azimuth illumination may be achieved. However, embodiments are not limited to a particular offset or azimuth.

In some embodiments, a source closest to the streamers can be fired simultaneously with one of the far offset sources. Dithered actuation, such as pseudo-randomized time-delay of actuation of the sources, can be used to improve the separation process. As a result of using randomized firing schemes, coherency measures in the proper domains can be utilized to actively separate the recorded data over the individual sources. Energy that can be uniquely identified as coherent, after alignment for any one of the sources, may be distributed to that source. Energy that the algorithm cannot distribute to any of the sources can be collected as residual. Focusing on one of the source-pairs, the source separation and seismic interference attenuation is described herein.

In accordance with a number of embodiments of the present disclosure, a geophysical data product may be produced. The geophysical data product may include, for example, seismic interference attenuated data. Geophysical data may be obtained and stored on a non-transitory, tangible computer-readable medium. The geophysical data product may be produced by processing the geophysical data offshore (i.e. by equipment on a vessel) or onshore (i.e. at a facility on land) either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore. For example, the recorded seismic data can be separated into a coherent portion and a residual portion offshore or onshore to facilitate other processing of the data either offshore or onshore. As another example, seismic interference attenuation can be performed on the residual portion of the separated seismic data offshore or onshore to facilitate other processing of the measured data either offshore or onshore. Embodiments of the present disclosure can be used with shallow (e.g., on the order of tens of meters) and/or deep (e.g., on the order of hundreds of meters or thousands of meters) water surveys.

Figure 2:
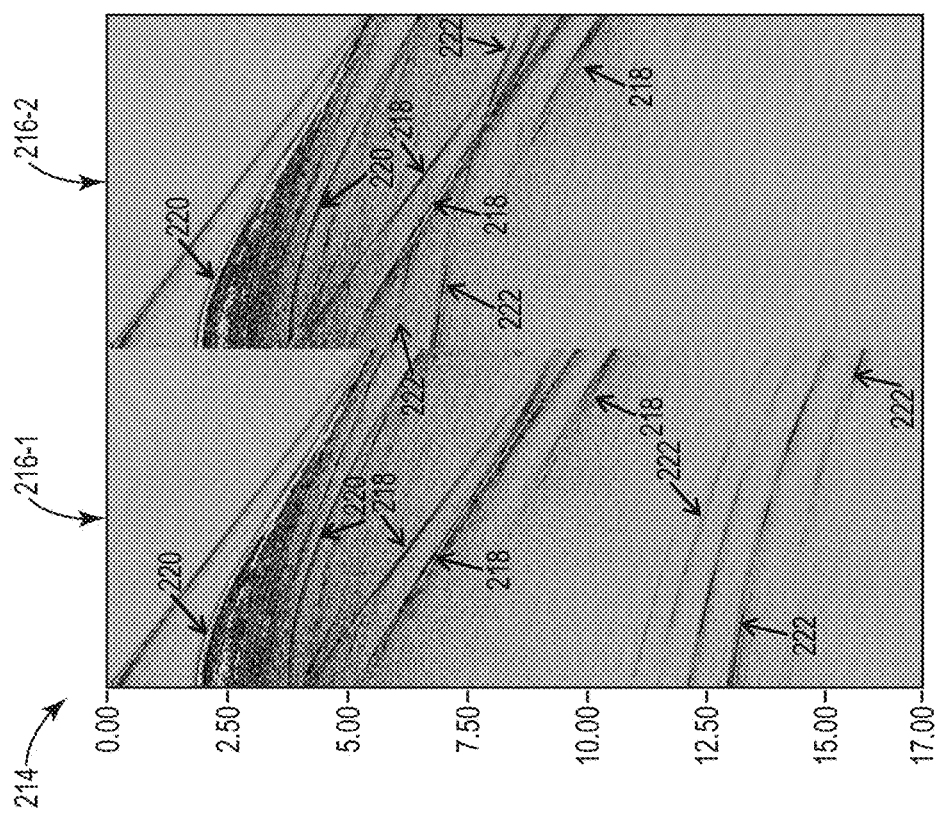
FIG. 2 is a diagram of recorded seismic data according to one or more embodiments of the present disclosure.

FIG. 2 is a diagram of recorded seismic data 214 according to one or more embodiments of the present disclosure. Two shot gathers 216-1, 216-2 are illustrated from blended input data. The energy from a first source, for example, source 102-1 illustrated in FIG. 1, is indicated by arrows 218. The energy for a second source, for example source 102-2 illustrated in FIG. 1, is indicated by arrows 220. The seismic interference energy is indicated by arrows 222.

In some embodiments, source separation or deblending can be treated as an inverse problem, however embodiments are not so limited. According to the present disclosure, source separation may be used and extended to include seismic interference attenuation. This can constrain the source separation based on coherency measures. Separating the recorded seismic data 214 can include separation through minimization of a cost function that describes the residual portion, which may also be referred to as "data misfit" or "noise bucket." The residual portion, r is given by:

$$r = y - A\begin{bmatrix} x_1 \\ \overline{x_n} \end{bmatrix} \quad (1)$$

where y is the recorded blended data, A is the blending operator, and $x_1$, $x_n$ are the separated data for the individual sources for which the separation is solved. Initially, the residual equals the recorded seismic data 214 (the full blended input data). In each iteration, after aligning the data for the different sources, coherent energy can be extracted from the residual and distributed to the separated data gathers of the individual sources. Energy that appears to be residual, independent for what source it is aligned, can remain in the residual after the separation. That is, of the energy that has been aligned for a particular source, the coherent portion can be distributed to the separated data gather for the particular source and the residual can remain in the residual. This is true for each source. Therefore, the residual can include residual energy that was aligned for different sources. Energy in the residual may not be lost since it can be added to the separated data afterwards.

Separation and seismic interference attenuation can be performed in phases. A conservative separation can be applied to the data (e.g., the data 214 illustrated in FIG. 2) with the goal of separating the strongest coherent energy portions of the first source and the second source without affecting the seismic interference energy. Conservative settings may be used to avoid any seismic interference energy being distributed to any of the simultaneous sources, rather keeping it isolated in the residual. The source separation can also yield residual data that is not attributed to a particular source during the first, conservative, source separation. Because the first source separation is conservative, some data that is actually attributable to the first source and/or the second source may be included in the residual data.

Figure 3:
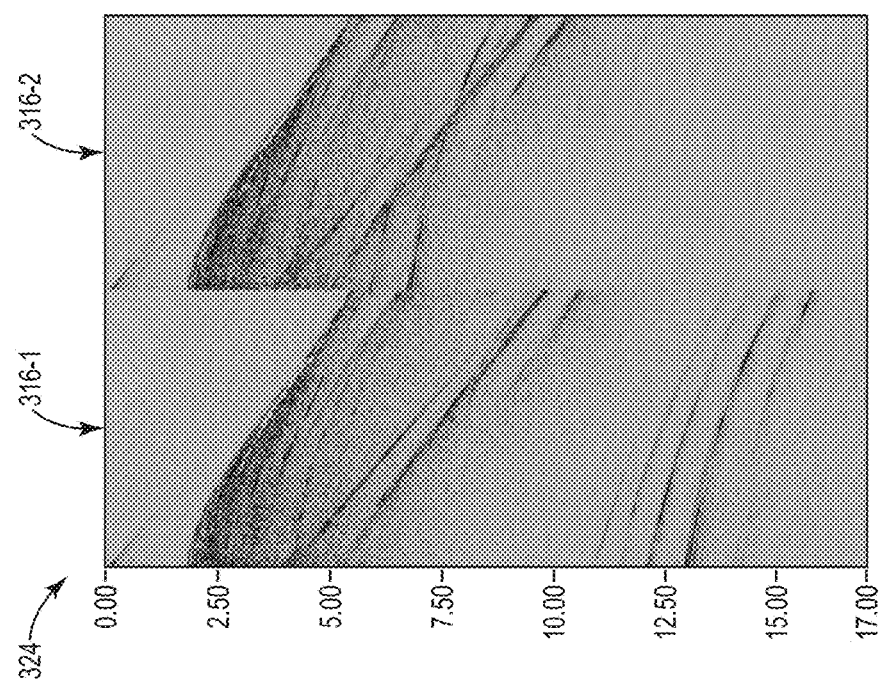
FIG. 3 is a diagram of residual data after the source separation on the recorded seismic data illustrated in FIG. 2 according to one or more embodiments of the present disclosure.

FIG. 3 is a diagram of residual data 324 after the source separation on the recorded seismic data 214 illustrated in FIG. 2 according to one or more embodiments of the present disclosure. The residual data 324 is illustrated in the two shot gathers 316-1, 316-2, which correspond to the two shot gathers 216-1, 216-2 illustrated in FIG. 2. The residual data 324 is the resulting noise bucket after a first, conservative, source separation. A considerable amount of energy can be extracted from the data and separated to the different sources while the seismic interference energy remains in the residual.

After the separation, the residual can contain different types of data, including: primary energy and any type of noise (e.g., barnacle noise) that is incoherent in the domains where the source separation is applied. If the firing times and locations of the sources that initiate the seismic interference are known, the seismic interference source(s) can be included in the deblending problem and extract and/or separate the seismic interference energy using a deblending algorithm. In such an example, additional unknown $x_i$'s may be added to equation (1) that represent the seismic interference source(s). Like for the simultaneous sources, the blended data can be aligned for the seismic interference source(s) after which its energy becomes coherent allowing the deblending algorithm to separate the seismic interference energy from the data.

However, if this information is unavailable, the firing times and locations of the seismic interference sources cannot be used to align and extract the seismic interference energy in the same way it is done for the simultaneous sources. Nevertheless, the incoherent behavior of the seismic interference energy still allows for inclusion in the deblending algorithm. In the proper data representation domain(s), the seismic interference energy may be left unattributed during the separation process. This means that the seismic interference may not end up in the separated gathers of the individual sources, but can be isolated in the residual after the separation is done. With the seismic interference isolated in the residual, it may become easier to attenuate it compared to attenuation of the blended data. Seismic interference attenuation can be applied to the residual, for example, in response to the seismic interference energy being isolated in the residual.

Figure 4:
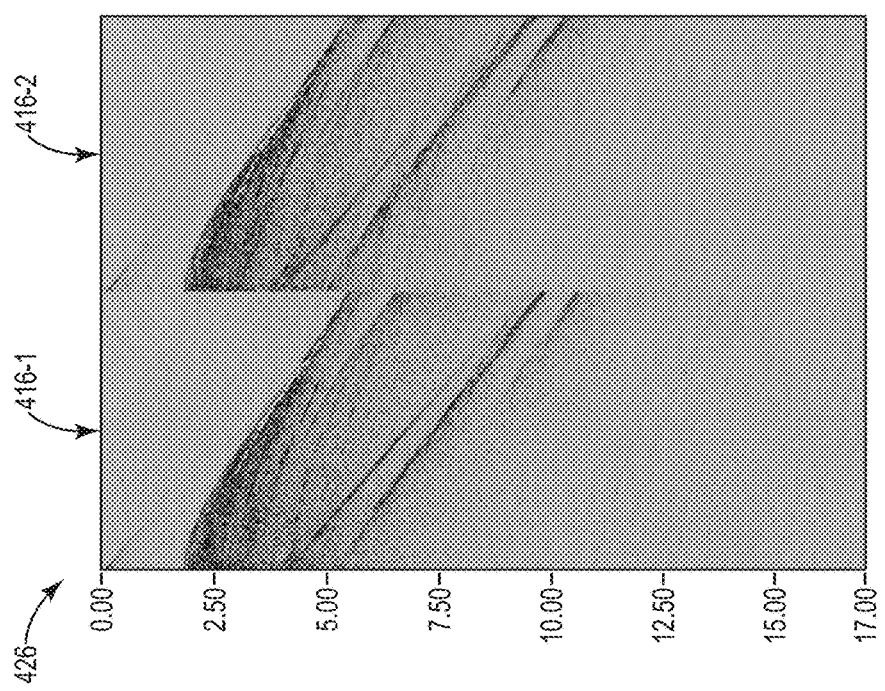
FIG. 4 is a diagram of the residual data illustrated in FIG. 3 minus seismic interference according to one or more embodiments of the present disclosure.

FIG. 4 is a diagram of the residual data 324 illustrated in FIG. 3 minus seismic interference according to one or more embodiments of the present disclosure. That is, the seismic interference attenuated residual data 426 illustrated in FIG. 4 represents the residual data after seismic interference is removed therefrom. The seismic interference attenuated residual data 426 is illustrated in the two shot gathers 416-1, 416-2, which correspond to the two shot gathers 216-1, 216-2 illustrated in FIG. 2. In FIG. 4, the same residual is shown after the seismic interference attenuation is applied. Seismic interference attenuation can be performed on the residual data 324 illustrated in FIG. 3 to result in the seismic interference attenuated residual data 426. Source separation (which may be less conservative) can be applied to the seismic interference attenuated residual data 426 after the seismic interference attenuation. In some embodiments, a less conservative source separation can be applied in response to the seismic interference energy being removed from the residual data.

Figure 5:
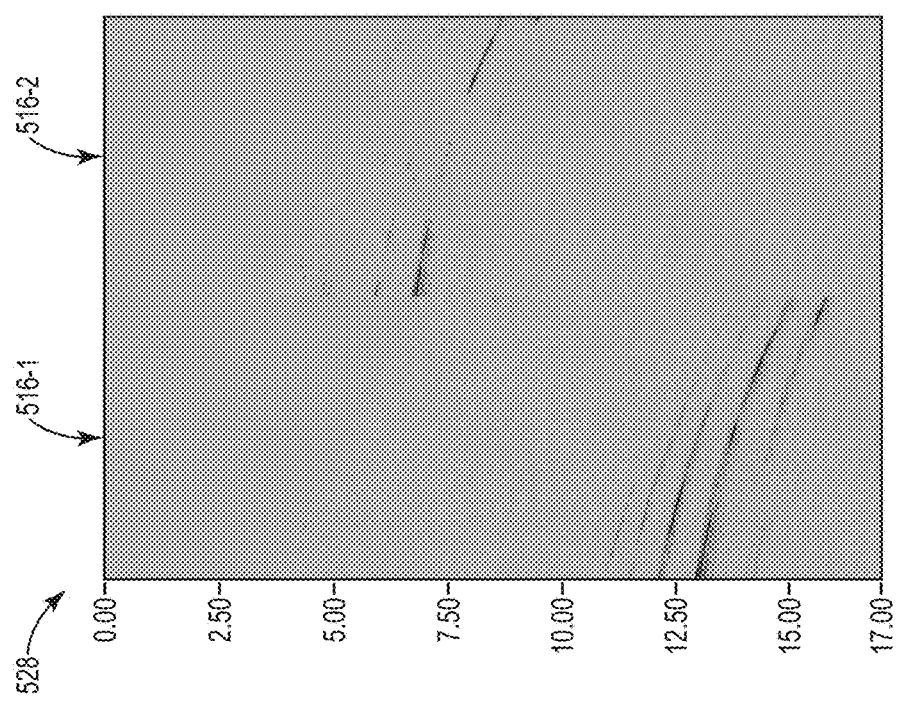
FIG. 5 is a diagram of the seismic interference removed from the residual data illustrated in FIG. 3 according to one or more embodiments of the present disclosure.

FIG. 5 is a diagram of the seismic interference 528 removed from the residual data 324 illustrated in FIG. 3 according to one or more embodiments of the present disclosure. The seismic interference is illustrated in the two shot gathers 516-1, 516-2, which correspond to the two shot gathers 216-1, 216-2 illustrated in FIG. 2. For instance, this may be the difference between FIGS. 3 and 4.

Figure 6:
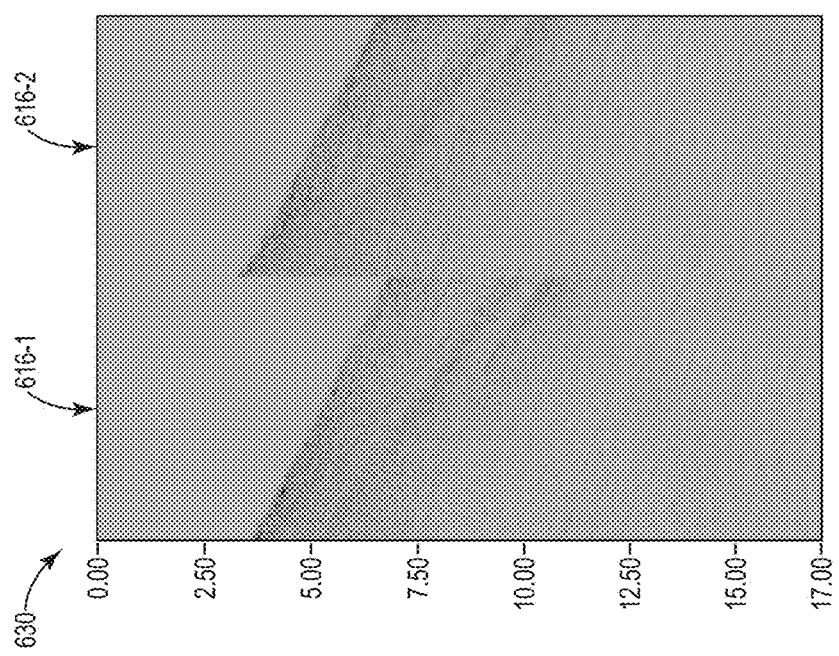
FIG. 6 is a diagram of updated seismic interference attenuated residual data after the source separation on the seismic interference attenuated residual data illustrated in FIG. 4 according to one or more embodiments of the present disclosure.

FIG. 6 is a diagram of updated seismic interference attenuated residual data 630 after the source separation on the seismic interference attenuated residual data 426 illustrated in FIG. 4 according to one or more embodiments of the present disclosure. The updated seismic interference attenuated residual data 630 is illustrated in the two shot gathers 616-1, 616-2, which correspond to the two shot gathers 216-1, 216-2 illustrated in FIG. 2.

The source separation can be performed to separate the seismic interference attenuated residual data into a respective seismic interference attenuated portion for each source and an updated seismic interference attenuated residual data 630 portion. This is also referred to herein as the second source separation, which can be a less conservative separation because the seismic interference has already been attenuated from the data. The updated residual after the second source separation is shown in FIG. 6. In such an example, the separation may not be able to identify this energy as coherent for any of the sources. Further, some remnant energy may be residual primary energy for either one of the two simultaneous sources while the rest is residual noise that a coherency based separation process may be expected to leave in the residual.

Figure 7:
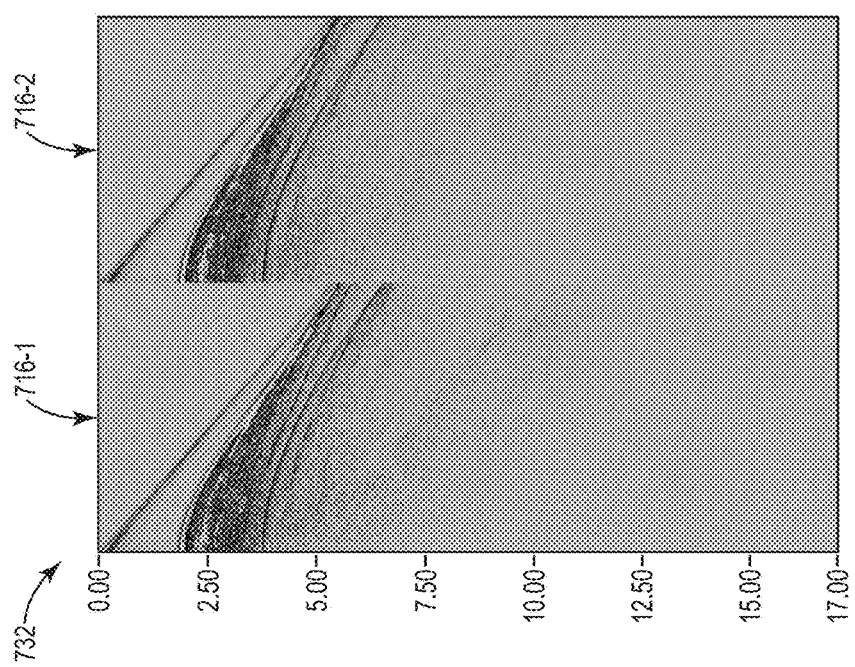
FIG. 7 is a diagram of separated data for the first source according to one or more embodiments of the present disclosure.
Figure 8:
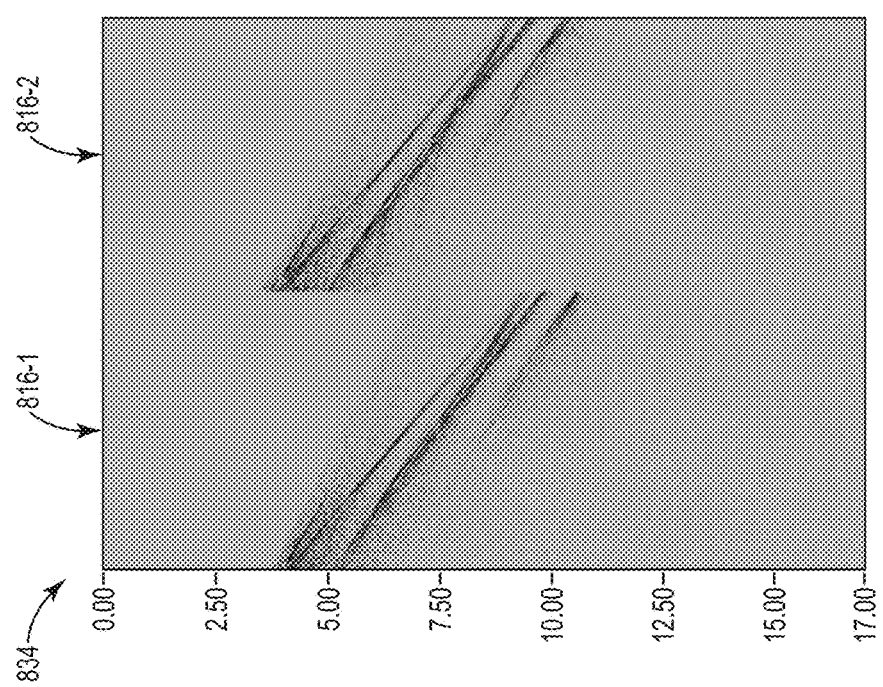
FIG. 8 is a diagram of separated data for the second source according to one or more embodiments of the present disclosure.

For each source, the separated signals from the first source separation and the second source separation can be added together respectively to obtain a total separated signal for each source as illustrated in FIG. 7 and FIG. 8. In some embodiments, the updated seismic interference attenuated residual data 630 can be added to the separated signal gathers for each of the sources. The updated seismic interference attenuated residual data 630 may include unseparated data and, thus, may include energy from each of the sources. This energy left in the residual can be added back to both sources to avoid the loss of remnant primary energy, for example, to prevent signal loss. A conservative approach may be taken by preferring to leave more energy in the residual instead of making the separation more aggressive and risking more leakage from one source to the other, which implies signal loss. Given the amount of data, the additional noise added back may not affect any further processing and imaging results.

FIG. 7 is a diagram of a separated data 732 for the first source according to one or more embodiments of the present disclosure. The separated data 732 is illustrated in the two shot gathers 716-1, 716-2, which correspond to the two shot gathers 216-1, 216-2 illustrated in FIG. 2. The separated data 732 can include the data separated for the first source from the recorded seismic data 214 and the data separated for the first source from the seismic interference attenuated residual data 426. In some embodiments, the separated data 732 can also include the updated residual data 630 illustrated in FIG. 6. As can be observed in FIG. 7, only some energy, for example, a minimal amount of energy, from the interfering second source has leaked into this gather.

FIG. 8 is a diagram of separated data 834 for the second source according to one or more embodiments of the present disclosure. The separated data 834 is illustrated in the two shot gathers 816-1, 816-2, which correspond to the two shot gathers 216-1, 216-2 illustrated in FIG. 2. The separated data 834 can include the data separated for the second source from the recorded seismic data 214 and the data separated for the second source from the seismic interference attenuated residual data 426. In some embodiments, the separated data 834 can include the updated residual data 630 illustrated in FIG. 6. Again, only some energy (e.g., minimal energy) leaked from the interfering first source into the gather. Quality control analysis, like migrated difference plots, can also indicate reduced leakage in the separation result of both sources.

Some embodiments of the present disclosure can be applied to both data having a coherent portion that corresponds to one source element or one source unit (sometimes referred to as "conventional data" that does not involve simultaneous sources) and to data recorded with a temporal overlap between actuation of a plurality of sources, such as a source array (sometimes referred to as simultaneous source data or simultaneous recorded data). For example, regarding simultaneous recorded data, source separation can be applied to the recorded data. Coherent energy that belongs to any of the individual sources can be appointed to one of the separated data gathers. Energy that may not be uniquely appointed to any of the sources (incoherent energy independent for which source it is aligned) can be left over in a residual. Since seismic interference is incoherent independent of which source the data is aligned with, it can be isolated in the residual. Seismic interference attenuation can then be applied to the residual. In some instances, seismic interference attenuation can be applied to the residual instead of the original recorded data which may contain a lot of (strong) reflection from individual sources fired in the simultaneous source acquisition. In response, the residual (without the seismic interference in it) can be added back to the separated data of each of the individual sources. Embodiments applied to conventional data are described in more detail with respect to FIGS. 9-13.

Although not specifically illustrated, another approach to seismic interference attenuation can include applying a first source separation (e.g., a conservative source separation) to recorded seismic data (e.g., recorded seismic data 214 illustrated in FIG. 2), which separates the recorded seismic data into a respective portion for each source and a residual (e.g., residual data 324 illustrated in FIG. 3), applying seismic interference attenuation to the residual, and subtracting the seismic interference (e.g., seismic interference 528 illustrated in FIG. 5) from the recorded seismic data, which would yield seismic interference attenuated recorded seismic data. A second source separation (e.g., a less conservative source separation) can be applied to the seismic interference attenuated recorded seismic data to yield a respective separated signal for each source and an updated residual. In some embodiments, the updated residual can be added to the separated signal gathers for each of the sources. Because the updated residual is unseparated data, it can include energy from each of the simultaneous sources.

Figure 9:
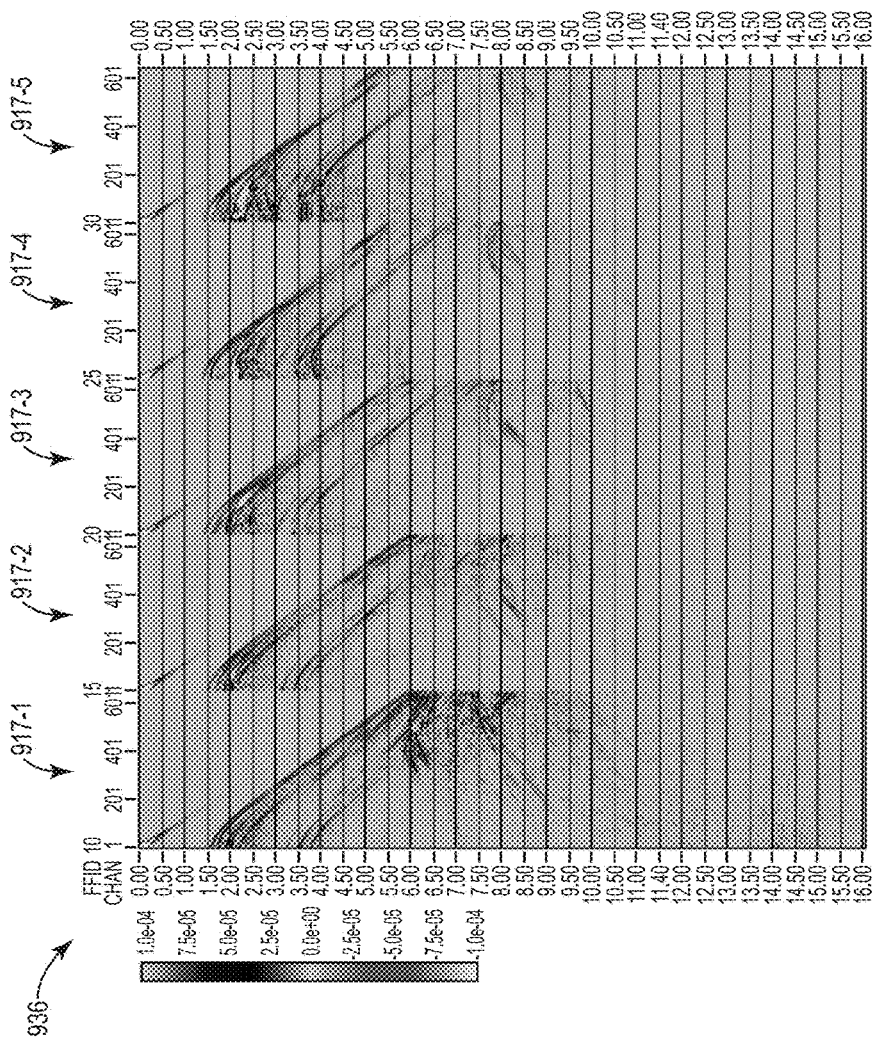
FIG. 9 is a diagram of modeled seismic data without interference.

FIG. 9 is a diagram of modeled seismic data 936 without interference. The modeled seismic data 936 is an illustration of synthetic conventional data, for example, using Society of Exploration Geophysicists Advanced Modeling Program data, that can be used as reference data. Regarding conventional data, the recorded data, such as blended or unblended data, can be separated into a coherent portion and a residual portion. Five shot gathers 917-1, 917-2, 917-3, 917-4, 917-5 are illustrated in the synthetic data.

Dithering of sources during simultaneous source acquisitions (to apply source separation based on coherency criteria) can influence the randomness of the seismic interference in the domains the separation is applied. Separation of conventional data with seismic interference in a signal part and a residual part can be applied without dither times, however applying dither times can enhance this process. The same idea can be applied for conventional data acquisition. For instance, although a survey may be fired with just one source firing each time, applying dither times to the source can enhance the randomness of the seismic interference in the proper domains and enhance the proposed seismic interference attenuation to a residual even further. Accordingly, some embodiments of the present disclosure can be used with seismic data that is recorded from one source element or one source unit having dithered actuation.

Figure 10:
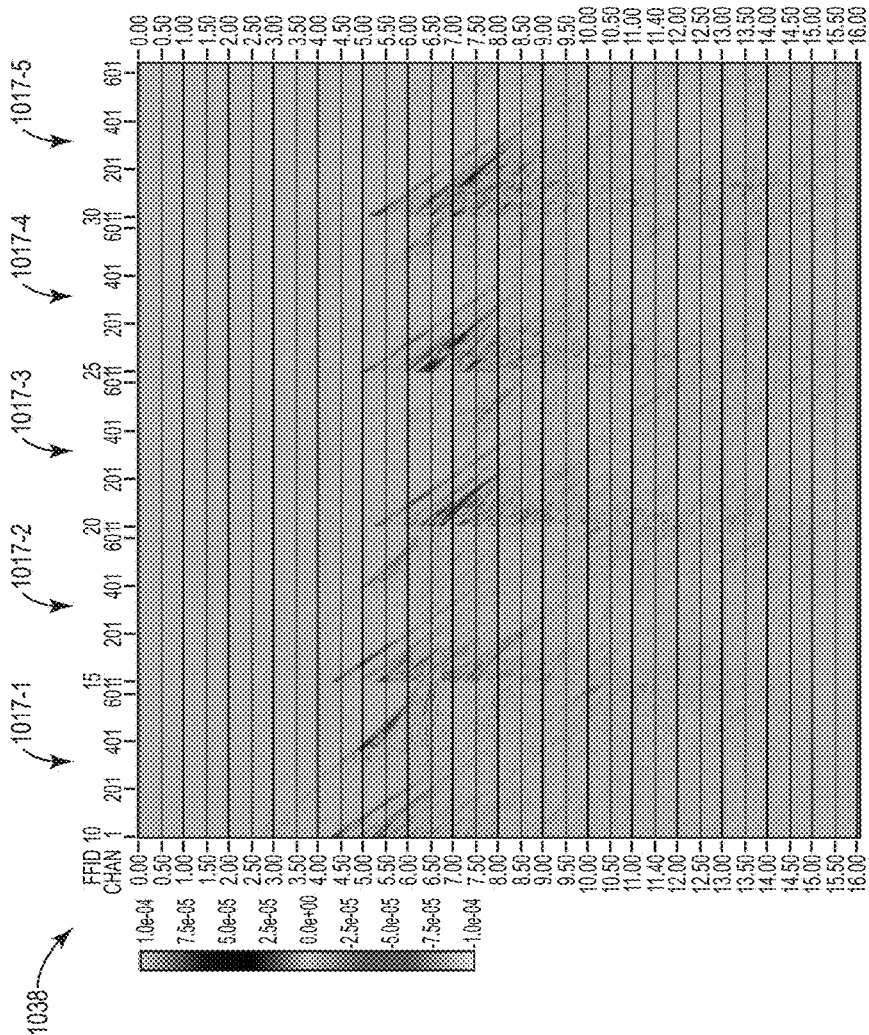
FIG. 10 is a diagram of modeled seismic interference.

FIG. 10 is a diagram of modeled seismic interference 1038. The modeled seismic interference 1038 is illustrated in the five shot gathers 1017-1, 1017-2, 1017-3, 1017-4, 1017-5, which correspond to the five shot gathers 917-1, 917-2, 917-3, 917-4, 917-5 illustrated in FIG. 9. The modeled seismic interference 1038 can be used as reference data.

Figure 11:
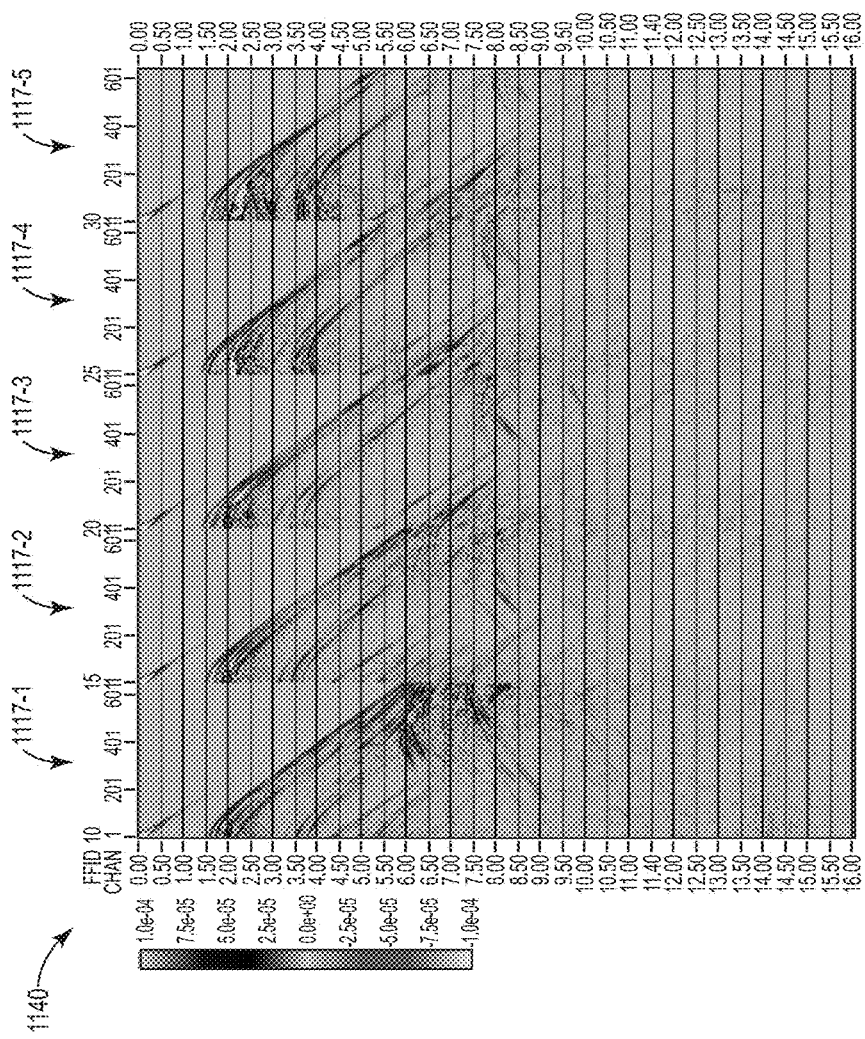
FIG. 11 is a diagram of combined data from the modeled seismic data illustrated in FIG. 9 combined with the modeled seismic interference illustrated in FIG. 10.

FIG. 11 is a diagram of combined data 1140 from the modeled seismic data illustrated in FIG. 9 combined with the modeled seismic interference illustrated in FIG. 10. The combined data 1140 is illustrated in the five shot gathers 1117-1, 1117-2, 1117-3, 1117-4, 1117-5, which correspond to the five shot gathers 917-1, 917-2, 917-3, 917-4, 917-5 illustrated in FIG. 9. The combined data 1140 is a synthetic representation of conventional data recorded with seismic interference.

Figure 12:
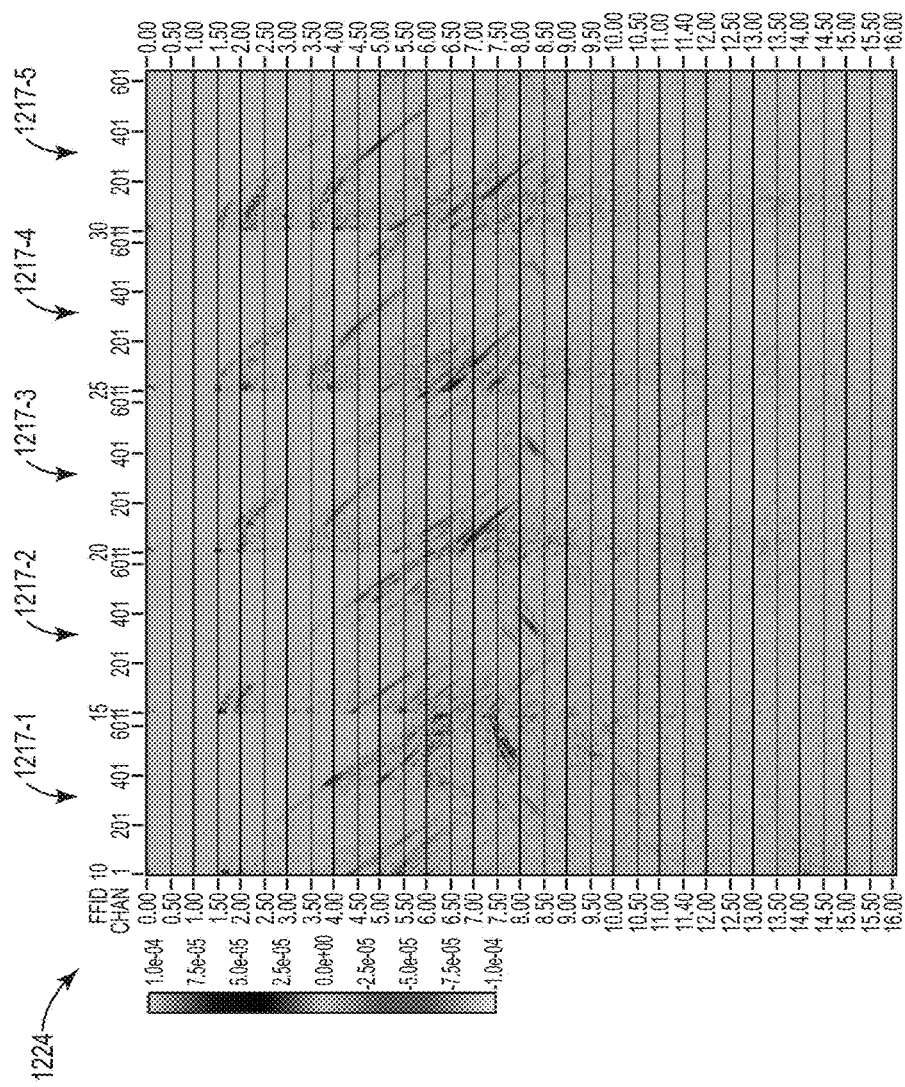
FIG. 12 is a diagram of residual data separated from the combined data illustrated in FIG. 11 according to one or more embodiments of the present disclosure.

FIG. 12 is a diagram of residual data 1224 separated from the combined data 1140 illustrated in FIG. 11 according to one or more embodiments of the present disclosure. The residual data 1224 is illustrated in the five shot gathers 1217-1, 1217-2, 1217-3, 1217-4, 1217-5, which correspond to the five shot gathers 917-1, 917-2, 917-3, 917-4, 917-5 illustrated in FIG. 9. In the example illustrated in FIG. 12, seismic interference remains in the residual, where most of the primary source energy is removed. As described herein it can be easier to apply seismic interference attenuation to this data than to the combined data 1140 illustrated in FIG. 11.

Figure 13:
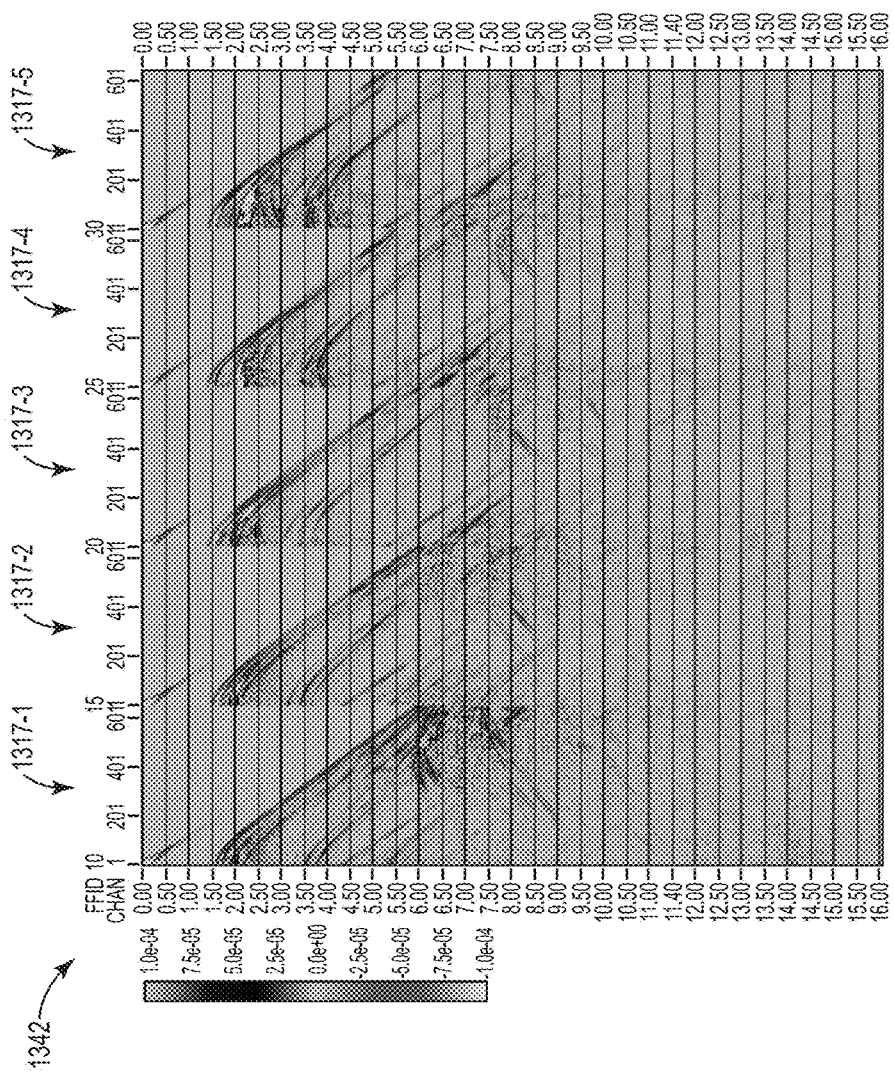
FIG. 13 is a diagram of coherent data separated from the combined data illustrated in FIG. 11 according to one or more embodiments of the present disclosure.

FIG. 13 is a diagram of coherent data 1342 separated from the combined data 1140 illustrated in FIG. 11 according to one or more embodiments of the present disclosure. The coherent data 1342 is illustrated in the five shot gathers 1317-1, 1317-2, 1317-3, 1317-4, 1317-5, which correspond to the five shot gathers 917-1, 917-2, 917-3, 917-4, 917-5 illustrated in FIG. 9. In the example illustrated in FIG. 13, following separation, most of the primary source energy is in the coherent portion. In this example, no seismic interference energy is in the gathers 1317-1, 1317-2, 1317-3, 1317-4, 1317-5.

Figure 14:
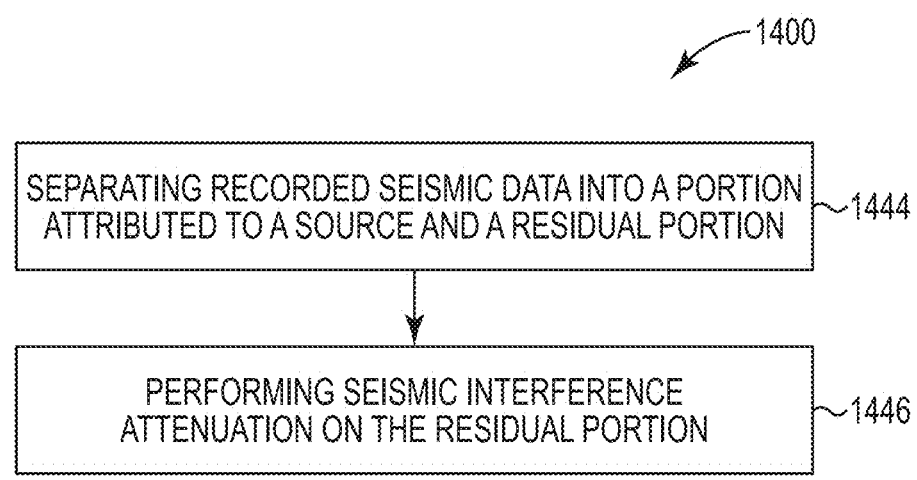
FIG. 14 illustrates an example method for interference attenuation of a residual portion of seismic data according to one or more embodiments of the present disclosure.

FIG. 14 illustrates an example method for interference attenuation of a residual portion of seismic data according to one or more embodiments of the present disclosure. The method 1400 can include separating recorded seismic data into a portion attributed to a source and a residual portion as illustrated at block 1444. Separating the data can include applying source separation to the recorded seismic data, for example to separate the data into a respective portion for each source associated with the data. In some embodiments the source can be a source array and the recorded seismic data can be recorded with a temporal overlap between actuation of a plurality of source elements or source units in the source array. As described herein, in some embodiments, this can be an iterative process. Separating the data can include separating data that is not attributed to one of the plurality of source elements or source units, according to the source separation, to the residual portion. In some embodiments, separating the recorded seismic data can include separating through minimization of a cost function that describes the residual portion. As described herein, the residual portion can include residual primary energy, residual noise, seismic interference energy, and cross talk. Residual noise can be distinguished from seismic interference energy in that it is not coherent in any domain, whereas the interference can be coherent, for example, in a shot domain. That is, the noise is not attributable to a particular source, but can be, for example, weather related, vessel operation related, etc.

The method 1400 can include performing seismic interference attenuation on the residual portion as illustrated at block 1446. Performing seismic interference attenuation can include removing noise from the residual portion. For example, the noise can be coherent in a shot domain and incoherent in a domain where the recorded seismic data was separated. The seismic interference can be coherent in its own shot domain, which may not be a domain that is known to the entity recording the data, for example, where the seismic interference is generated by a source associated with another vessel in the area where the recording is taking place. The domain in which the recorded seismic data is separated can be one or more of common receiver, common channel, common offset, common depth point, and common midpoint, among others.

The method 1400 can include adding the residual portion, minus the seismic interference, to the portion attributed to the source, where the portion attributed to the source corresponds to a source array. The recorded seismic data can be recorded with a temporal overlap between actuation of source elements or source units in the source array. The recorded seismic data can be recorded from the source array having dithered actuation. For example, such embodiments can be used with simultaneous sources in the source array. In contrast, the method 1400 can include subtracting the seismic interference from the recorded seismic data. For example, such embodiments can be used with conventional data with our without dithered actuation of the source.

Figure 15:
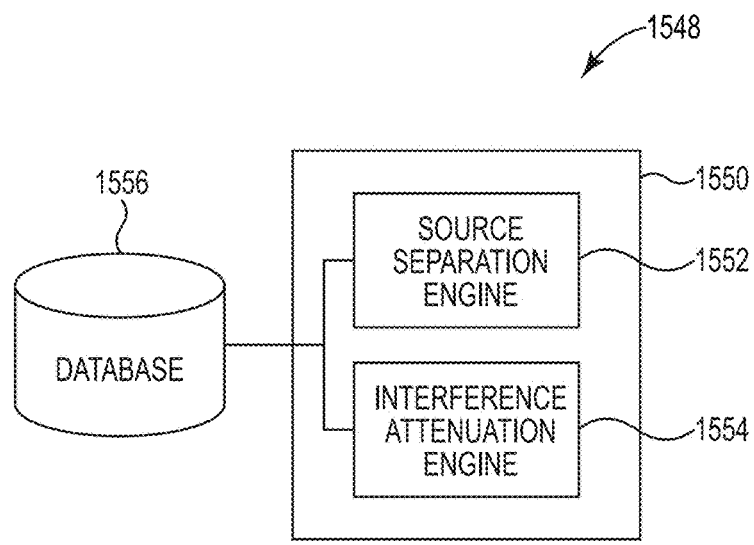
FIG. 15 is a diagram of a system for interference attenuation of a residual portion of seismic data according to one or more embodiments of the present disclosure.

FIG. 15 is a diagram of a system 1548 for interference attenuation of a residual portion of seismic data according to one or more embodiments of the present disclosure. The system 1548 can include a database 1556, a subsystem 1550, and/or a number of engines, for example source separation engine 1552 and/or interference attenuation engine 1554, and can be in communication with the database 1556 via a communication link. The system 1548 can include additional or fewer engines than illustrated to perform the various functions described herein. The system can represent program instructions and/or hardware of a machine (e.g., machine 1658 as referenced in FIG. 16, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource, such as a machine-readable medium, as well as hard-wired program such as logic. Hard-wired program instructions such as logic can be considered as both program instructions and hardware.

The source separation engine 1552 can include a combination of hardware and program instructions that is configured to separate recorded seismic data into a first respective portion for each of a plurality of sources and a residual portion. In some embodiments the plurality of sources can include a near offset source and a far offset source, for example, as described with respect to FIG. 1. The recorded seismic data can be recorded from a full-azimuth marine seismic survey with a temporal overlap between actuation of the plurality of sources, however embodiments are not so limited. As described herein, a full-azimuth survey can be beneficial for imaging below complex salt structures.

The interference attenuation engine 1554 can include a combination of hardware and program instructions that is configured to remove seismic interference from the residual portion to yield a seismic interference attenuated residual portion. The interference attenuation engine 1554 can be configured not to perform seismic interference attenuation on the respective portion for each of the plurality of sources.

The source separation engine 1552 can be configured to separate the seismic interference attenuated residual portion into a second respective portion for each of the plurality of sources and an updated seismic interference attenuated residual portion. The source separation engine 1552 can be configured to add the first respective portion for each of the plurality of sources and the second respective portion for each of the plurality of sources to yield a total separated portion for each of the plurality of sources. The source separation engine 1552 can be configured to add the updated seismic interference attenuated residual portion to the total separated portion for each of the plurality of sources. The source separation engine 1552 can be configured to separate the recorded seismic data more conservatively than the seismic interference attenuated data. The source separation engine 1552 can be configured to separate the recorded seismic data without using data comprising a location or actuation time of a source contributing to the seismic interference. As described herein, such embodiments can be beneficial where the source of the seismic interference is controlled by an entity other than the entity recording the data, such as a source associated with a vessel conducting a different seismic survey in the same area.

Figure 16:
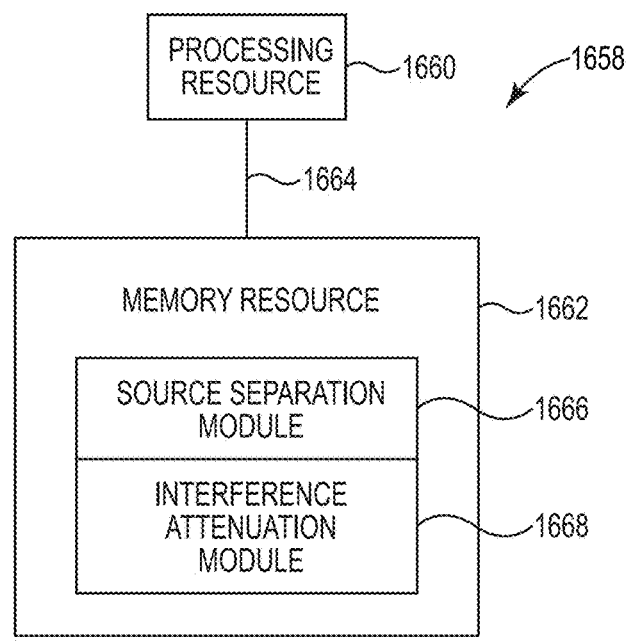
FIG. 16 is a diagram of a machine for interference attenuation of a residual portion of seismic data according to one or more embodiments of the present disclosure.

FIG. 16 is a diagram of a machine 1658 for interference attenuation of a residual portion of seismic data according to one or more embodiments of the present disclosure. The machine 1658 can utilize software, hardware, firmware, and/or logic to perform a number of functions. The machine 1658 can be a combination of hardware and program instructions configured to perform a number of functions or actions. The hardware, for example, can include a number of processing resources 1660 and a number of memory resources 1662, such as a machine-readable medium or other non-transitory memory resources 1662. The memory resources 1662 can be internal and/or external to the machine 1658. For example, the machine 1658 can include internal memory resources and have access to external memory resources. The program instructions, such as machine-readable instructions, can include instructions stored on the machine-readable medium to implement a particular function, such as performing seismic interference attenuation on a residual portion of separated seismic data. The set of machine-readable instructions can be executable by one or more of the processing resources 1660. The memory resources 1662 can be coupled to the machine 1658 in a wired and/or wireless manner. For example, the memory resources 1662 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

Memory resources 1662 can be non-transitory and can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid state drive, etc., as well as other types of machine-readable media.

The processing resources 1660 can be coupled to the memory resources 1662 via a communication path 1664. The communication path 1664 can be local or remote to the machine 1658. Examples of a local communication path 1664 can include an electronic bus internal to a machine, where the memory resources 1662 are in communication with the processing resources 1660 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 1664 can be such that the memory resources 1662 are remote from the processing resources 1660, such as in a network connection between the memory resources 1662 and the processing resources 1660. That is, the communication path 1664 can be a network connection. Examples of such a network connection can include a local area network, wide area network, personal area network, and the Internet, among others.

As shown in FIG. 16, the machine-readable instructions stored in the memory resources 1662 can be segmented into a number of modules 1666, 1668 that when executed by the processing resources 1660 can perform a number of functions. As used herein a module includes a set of instructions included to perform a particular task or action. The number of modules 1666, 1668 can be sub-modules of other modules. For example, the interference attenuation module 1668 can be a sub-module of the source separation module 1666 and/or can be contained within a single module. Furthermore, the number of modules 1666, 1668 can comprise individual modules separate and distinct from one another. Examples are not limited to the specific modules 1666, 1668 illustrated in FIG. 16.

Each of the number of modules 1666, 1668 can include program instructions and/or a combination of hardware and program instructions that, when executed by a processing resource 1660, can function as a corresponding engine as described with respect to FIG. 15. For example, the source separation module 1666 can include program instructions and/or a combination of hardware and program instructions that, when executed by a processing resource 1660, can function as the notional source separation engine 1552 and/or the interference attenuation module 1668 can include program instructions and/or a combination of hardware and program instructions that, when executed by a processing resource 1660, can function as the interference attenuation engine 1554.

The machine 1658 can include a source separation module 1666, which can include instructions to separate recorded seismic data into a portion attributed to a source and a residual portion. In some embodiments, the portion attributed to the source can correspond to one source element or one source unit, for example, as may be associated with conventional data. The residual portion can be determined based on the recorded seismic data, a blending operator, and separated data for individual actuations of the one source element or the one source unit. The instructions to separate the recorded seismic data can include instructions to iteratively minimize a cost function that describes the residual portion, as described herein. The one source element or one source unit can have dithered actuation. The residual portion can represent at least one of residual primary energy, residual noise, seismic interference energy, and cross talk. The machine 1658 can include an interference attenuation module 1668, which can include instructions to perform seismic interference attenuation on the residual portion to identify seismic interference in the residual portion. The source separation module 1666 can include instructions to subtract the seismic interference from the recorded seismic data (e.g., to yield seismic interference attenuated recorded seismic data). In some embodiments, the source separation module 1666 can include instructions to separate the seismic interference attenuated recorded seismic data to yield a separated signal for the source and an updated residual. The updated residual can be added to the separated signal for the source.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    separating, by a machine, recorded seismic data indicative of a subterranean formation into a residual portion and a quantity of portions that are coherent in a data domain, each portion attributed to a respective one of a quantity of sources actuated as part of a marine survey designed to generate the seismic data,
    wherein the quantity of portions is equal in number to the quantity of sources;
    performing, by the machine, seismic interference attenuation on the residual portion to remove seismic interference from the residual portion; and
    subtracting the seismic interference from the recorded seismic data to yield seismic interference attenuated recorded seismic data better indicative of the subterranean formation.

2. The method of claim 1, wherein performing seismic interference attenuation comprises removing noise from the residual portion.

3. The method of claim 2, wherein removing noise comprises removing noise that is coherent in a shot domain and incoherent in a domain where the recorded seismic data was separated.

4. The method of claim 1, further comprising separating the residual portion, after removal of the seismic interference, into an updated residual portion and a quantity of second portions, each of the second portions attributed to a respective one of the quantity of sources.

5. The method of claim 1, wherein the recorded seismic data is recorded with a temporal overlap between actuation of the quantity of sources, comprising a plurality of sources, and
    wherein the recorded seismic data is recorded from the plurality of sources having dithered actuation.

6. The method of claim 1, wherein separating the data comprises:
    applying source separation to the recorded seismic data, wherein the recorded seismic data was recorded with a temporal overlap between actuation of a plurality of source elements or source units comprising the quantity of sources; and
    separating data that is not attributed to one of the plurality of source elements or source units, according to the source separation, to the residual portion.

7. The method of claim 1, wherein separating the recorded seismic data comprises separating through minimization of a cost function that describes the residual portion.

8. A system, comprising:
    a source separation engine configured to separate recorded seismic data indicative of a subterranean formation into a first respective portion for each of a plurality of sources actuated as part of a marine survey designed to generate the seismic data and a residual portion; and
    an interference attenuation engine configured to remove seismic interference from the residual portion to yield a seismic interference attenuated residual portion;
    wherein the source separation engine is configured to:
        separate the seismic interference attenuated residual portion into a second respective portion for each of the plurality of sources and an updated seismic interference attenuated residual portion; and
        add the first respective portion for each of the plurality of sources and the second respective portion for each of the plurality of sources to yield a total separated portion for each of the plurality of sources; and
    wherein the interference attenuation engine is further configured to subtract the seismic interference from the recorded seismic data to yield seismic interference attenuated recorded seismic data better indicative of the subterranean formation.

9. The system of claim 8, wherein the source separation engine is configured to separate the recorded seismic data more conservatively than the seismic interference attenuated data.

10. The system of claim 8, wherein the source separation engine is configured to separate the recorded seismic data without using data comprising a location or actuation time of a source contributing to the seismic interference.

11. The system of claim 8, wherein the source separation engine is configured to add the updated seismic interference attenuated residual portion to the total separated portion for each of the plurality of sources.

12. The system of claim 8, wherein the interference attenuation engine is configured not to perform seismic interference attenuation on the respective portion for each of a plurality of sources.

13. A non-transitory machine-readable medium storing instructions executable by a processing resource to cause a computing system to:
  separate recorded seismic data indicative of a subterranean formation into a portion attributed to a source actuated as part of a marine survey designed to generate the seismic data and a residual portion not attributed to a source actuated as part of the marine survey,
    wherein the portion attributed to the source corresponds to one source element or one source unit; and
    wherein the residual portion is determined based on the recorded seismic data, a blending operator, and separated data for individual actuations of the one source element or the one source unit;
  perform a seismic interference attenuation on the residual portion to identify seismic interference in the residual portion; and
  subtract the seismic interference from the recorded seismic data to yield seismic interference attenuated recorded seismic data better indicative of the subterranean formation.

14. The medium of claim 13, wherein the residual portion represents at least one of: residual primary energy, residual noise, seismic interference energy, and cross talk.

15. The medium of claim 13, wherein the seismic data is recorded from the one source element or the one source unit having dithered actuation.

16. The medium of claim 13, wherein the instructions to separate the recorded seismic data comprise instructions to iteratively minimize a cost function that describes the residual portion.

17. The medium of claim 13, wherein the instructions to subtract the seismic interference from the recorded seismic data yield seismic interference attenuated recorded seismic data; and further including instructions to separate the seismic interference attenuated recorded seismic data to yield a separated signal for the source and an updated residual.

18. The medium of claim 17, further including instructions to add the updated residual to the separated signal for the source.

19. A method of generating a geophysical data product, the method comprising:
  obtaining geophysical data;
  processing the geophysical data to generate the geophysical data product, wherein processing the geophysical data comprises:
    separating, by a machine, recorded seismic data indicative of a subterranean formation into a residual portion and quantity of portions that are coherent in a data domain, each portion attributed to a respective one of a quantity of sources actuated as part of a marine survey designed to generate the seismic data, wherein the quantity of portions is equal in number to the quantity of sources;
    performing, by the machine, seismic interference attenuation on the residual portion to remove seismic interference from the residual portion; and
    subtracting the seismic interference from the recorded seismic data to yield seismic interference attenuated recorded seismic data better indicative of the subterranean formation.

20. The method of claim 19, further comprising recording the geophysical data product on a non-transitory machine-readable medium suitable for importing onshore.

21. The method of claim 19, wherein processing the geophysical data comprises processing the geophysical data offshore or onshore.

22. The method of claim 4, further comprising adding the updated residual portion to each of the quantity of second portions.

* * * * *